United States Patent [19]

Stabile et al.

[11] Patent Number: 4,871,920
[45] Date of Patent: Oct. 3, 1989

[54] HIGH POWER WIDE BAND AMPLIFIER USING OPTICAL TECHNIQUES AND IMPEDANCE MATCHING TO SOURCE AND LOAD

[75] Inventors: Paul J. Stabile, Langhorne, Pa.; Arye Rosen, Cherry Hill, N.J.; Fred Sterzer, Princeton, N.J.

[73] Assignee: General Electric Company, Schenectady, N.Y.

[21] Appl. No.: 182,537

[22] Filed: Apr. 18, 1988

[51] Int. Cl.$^4$ .............................................. G02B 27/00
[52] U.S. Cl. .................................... 250/551; 307/311
[58] Field of Search .......................... 250/551, 214 A; 307/311; 357/19

[56] References Cited

U.S. PATENT DOCUMENTS

| | | | |
|---|---|---|---|
| 3,321,631 | 5/1967 | Biard et al. | 250/551 |
| 3,524,986 | 8/1970 | Harnden, Jr. | 250/551 |
| 3,693,060 | 9/1972 | Joyce | 250/551 |
| 3,708,672 | 1/1973 | Marinkovic | 250/551 |
| 3,723,769 | 3/1973 | Collins | 307/311 |
| 4,110,608 | 8/1979 | Thomson | 307/311 |
| 4,166,224 | 8/1979 | Hutson | 307/311 |
| 4,227,098 | 10/1980 | Brown et al. | 307/311 |
| 4,390,790 | 6/1983 | Rodriguez | 250/551 |

OTHER PUBLICATIONS

R. A. Kiehl et al., "An Optically Coupled Microwave Switch," 1980, IEEE-MTTS-S, International Microwave Symposium, pp. 314–316.

*Primary Examiner*—David C. Nelms
*Assistant Examiner*—Stephone B. Allen
*Attorney, Agent, or Firm*—Henry I. Steckler; James C. Davis, Jr.; Paul R. Webb, II

[57] ABSTRACT

An amplifying apparatus has a plurality of series coupled laser diodes that impedance match a signal source impedance and which are optically coupled to at least one PIN diode that impedance matches a load impedance. A high DC voltage is applied to the PIN diode so that gain is obtained and signal power is applied to the load. A plurality of parallel coupled PIN diodes can be used or a series-parallel combination.

14 Claims, 1 Drawing Sheet

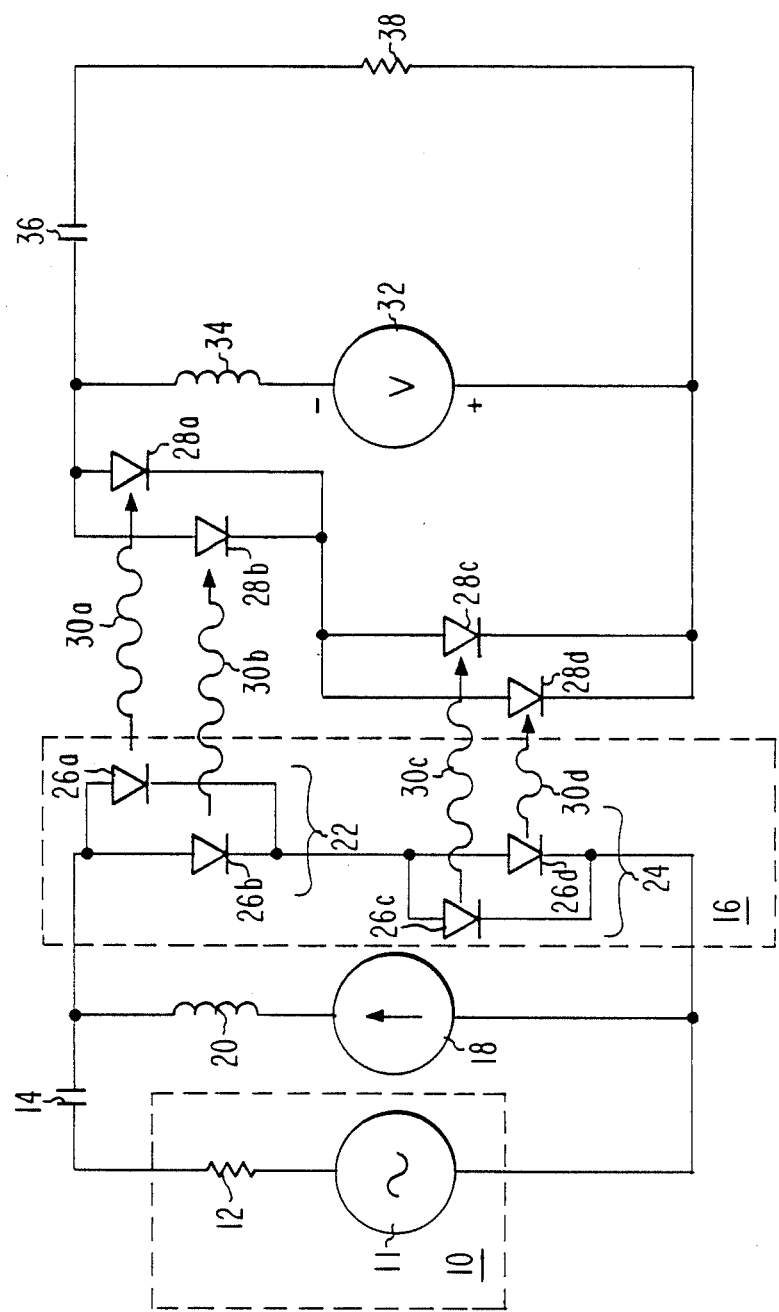

HIGH POWER WIDE BAND AMPLIFIER USING OPTICAL TECHNIQUES AND IMPEDANCE MATCHING TO SOURCE AND LOAD

BACKGROUND OF THE INVENTION

The present invention relates to a wide band amplifier, and more particularly, to such an amplifier that provides a large amount of power up to the microwave band using optical techniques.

In order to provide a large amount of power up to microwave frequencies using solid states devices, it is necessary to use a large number of transistors connected in parallel using combiners. However, combiners are lossy, bulky, and limit the bandwidth of the amplifier. Further, such an amplifier may not have a sufficiently high input-output isolation, which can result in amplifier instability, can be subseptable to electromagnetic interference or jamming, and is not compatible with optical signal distribution systems as being contemplated for use in modern phased array radars.

It is, therefore, desirable to have an amplifier that has a wide bandwidth, small size, provides a high power output, has a high input-output isolation, is highly immune to jamming and interference, and is compatible with optical signal distribution systems.

SUMMARY OF THE INVENTION

An apparatus for amplifying an input signal from source having an impedance comprises a first plurality of series coupled laser diodes adapted to receive said input signal and having an inherent impedance matched to the source impedance; and PIN diode means, optically coupled to said laser diodes, for providing an output signal to a load having an impedance, said PIN diode means having an inherent impedance matched to said load impedance.

BRIEF DESCRIPTION OF THE DRAWINGS

The sole FIGURE is a schematic drawing of an embodiment of the invention.

DETAILED DESCRIPTION OF THE PREFERRED EMBODIMENTS

The FIGURE shows a signal source 10 represented by an AC generator 11 and a resistor 12 of, e.g., 50 ohms, and representing an internal resistance. Although shown with an AC source 11, the source 10 can actually have a frequency of from DC (OHz) to several GHz. The signal from the source 10 is applied through a DC blocking means, such as a capacitor 14 to a laser diode array 16 (described below). As known in the art, other methods of blocking DC, e.g., a transformer, can be used. However, a transformer would undesirably be bulky and limit bandwidth. Of course, if the source 10 includes DC signals, then the DC blocking means 14 cannot be used. As known in the art, other signal blocking means, e.g., a tuned circuit or a transmission line, can be used although they are bandwidth limited.

A biasing means, such as a DC current generator 18, provides a DC bias current to each of the laser diodes in the array 16. Typically, the bias current is between about 3 to 4 times the lasing threshold current, which value provides maximum efficiency and minimum distortion, although up to about 10 times said threshold current can be provided. The maximum value of the bias current is limited by the heat dissipation rating of the laser diodes 26. Further, if it is desired to generate harmonics, little or no bias current can be used, provided that the input signal amplitude exceeds the lasing threshold of the laser diodes 26. Also biasing at the lasing threshold current can be used when the apparatus of the invention is used as a pulse signal amplifier. The bias current goes through the signal blocking means, such as a radio frequency choke (RFC) 20, to the array 16 in the forward bias direction.

The array 16 comprises first and second branches 22 and 24, with the branches 22 and 24 serially coupled to each other. The branch 22 comprises a pair of parallel coupled laser diodes 26a and 26b, while the branch 24 comprises a pair of parallel coupled laser diodes 26c and 26d. The parallel coupling is used to obtain high power. Although only two parallel coupled diodes are shown in each of the branches 22 and 24, more can be used. In a particular proposed embodiment, each of the branches has four parallel coupled laser diodes. Further, although only two series coupled branches 22 and 24 are shown, said embodiment has 100 branches. Since each of the laser diodes has an impedance of about 2 ohms, the array 16 has an impedance of about 50 ohms and thus matches the resistance 12 for maximum power transfer efficiency.

The laser diodes 26a, 26b, 26c, and 26d are optically coupled to PIN diodes 28a, 28b, 28c, and 28d, respectively, as indicated by the arrows 30a, 30b, 30c, and 30d, respectively. The diodes 28 preferably are of the lateral type to facilitate optical coupling. The diodes 28a and 28b are parallel coupled together and are series coupled to the parallel coupled combination of the diodes 28c and 28d. In said embodiment, the diodes 28 have an alternate configuration from that shown, i.e., they are all parallel coupled together, and have an I-conductivity type region width (distance between the P and N-conductivity type regions along the surface of a substrate) of e.g., about 100 $\mu$m (micrometer), so as to withstand a large reverse bias voltage (described below) to provide both gain and power, e.g., 2.5 KW. This normally results in a high resistance when the diodes 28 are reversed biased. In order to provide a match to a desired load impedance of about 50 ohms, the diodes 28 are all parallel coupled and also have a large length (the direction perpendicular to the width direction along the substrate surface) of e.g., about 1500 $\mu$m, which also results in a high light collection efficiency. Alternately, a single PIN diode 28 having a very large length can be used. Lateral PIN diodes are high frequency limited by the shorter of the transit time or minority carrier lifetime and, therefore, can provide amplification at very high frequencies, e.g., 5 GHz for a recombination time of 100 ps (picoseconds). A short recombination time, and thus a high frequency of operation, can be achieved by making them in semiconductor materials such as GaAs, InP, Au doped Si, etc.

If it is desired to provide operation at very high frequencies, e.g., 25 GHz, then a very short PIN diode width, e.g., 2 $\mu$m, can be used to obtain a short transit time. This will lower the maximum value of the reverse bias voltage that can be applied to the PIN diode (described below) without breakdown and thus the maximum power output. The applied voltage can be increased by using a plurality of PIN diodes in series as shown in the FIGURE. Since the PIN diodes 28 are simultaneously illuminated, their transit times are not additive even though they are coupled in series.

For the embodiment shown in the drawing having a PIN diode width of 2 μm, a DC voltage source 32 applies a potential of about 400 volts through a signal blocking means, such as a RFC 34, to reverse bias the PIN diodes 28. Typically, the voltage is slightly below the breakdown voltage of the PIN diodes 28 (or their series combination) for maximum power output. The signal is passed by a DC blocking means, such as a capacitor 36, to a load represented by a resistor 38, which normally is about 50 ohms.

In operation, when the source 10 is providing no signal to the diodes 26, no light is provided by the laser diodes 26 to the PIN diodes 28. No appreciable current is conveyed by the diodes 28, and thus no signal is present at the load 38. When the source 10 provides a signal to the laser diodes 26, the diodes 26 provide light in accordance with said signal to the PIN diodes 28. The light is converted into a current by the PIN diodes 28. Due to the large voltage across the PIN diodes 28, a large amount of power is generated, which is applied to the load 38.

EXAMPLE

For an apparatus having four parallel coupled sets of laser diodes, each set having 100 series coupled laser diodes, each diode having 2 ohms impedance, so as to provide a match to 50 ohms, with a laser current of $I_1$, a laser and PIN diode responsivity of 0.5 watts per ampere (W/A), and 0.5 amperes per watt (A/W), respectively, a load resistor 38 of 50 ohms, and an optical coupling efficiency (L) therebetween of 0.4, the output power of the lasers ($P_1$) is:

$$P_1 = 0.5 \text{ W/A } I_1 100 = 50 \text{ W/A } I_1,$$

the load power $P_o$ is:

$$P_o = I_o^2 R = (P_1 0.5 \text{ A/W } 0.4)^2 50,$$

substituting the top equation into the next one:

$$P_o = (50 \text{ W/A } I_1 0.5 \text{ A/W } 0.4)^2 50$$

the input power is:

$$P_i = I_i^2 R = I_1^2 50$$

and thus the power gain is:

$$\frac{P_o}{P_i} = \frac{(50 I_1 \times 0.5 \times 0.4)^2 \, 50}{I_1^2 \, 50} = 100 = 20 \text{ dB}$$

It will be appreciated that due to the impedance matching of the diodes 26 to the source 10 without bulky, lossy, and bandwidth limited matching devices, the apparatus of the invention is capable of gain over a wide bandwidth. This is in contrast to a simple laser diode illuminating on optical detector, such as an avalanche photodiode, wherein the mismatch losses in the input circuit coupled between the laser diode and the source are so large (especially at microwave frequencies) that system gain is not obtained despite the fact that the detector diode may have gain. The present invention is capable of amplifying signals having high modulation rates due to the short recombination time of the PIN diodes 28 and also it is believed to have a high input-output isolation, typically 100 dB, for high stability, and is compatible with optical signal distribution systems and, therefore, has a high immunity to interference and jamming.

What is claimed is:

1. Apparatus for amplifying an input signal from a source having an impedance, said apparatus comprising:
 a first plurality of series coupled laser diodes adapted to receive said input signal and having an inherent impedance matched to the source impedance; and
 PIN diode means, optically coupled to said laser diodes, for providing an output signal to a load having an impedance, said PIN diode means having an inherent impedance matched to said load impedance.

2. Apparatus as claimed in claim 1 wherein said PIN diode means comprises a plurality of parallel coupled PIN diodes.

3. Apparatus as claimed in claim 1 wherein said PIN diode means comprises a single PIN diode.

4. Apparatus as claimed in claim 1 further comprising a second plurality of laser diodes parallel coupled to said first plurality.

5. Apparatus as claimed in claim 1 wherein said laser diodes are AlGaAs diodes.

6. Apparatus as claimed in claim 1 wherein said PIN diode means comprises a first plurality of series coupled PIN diodes.

7. Apparatus as claimed in claim 1 wherein said PIN diode means comprises a low recombination time material.

8. Apparatus as claimed in claim 1 further comprising a DC voltage source coupled to said PIN diode means.

9. Apparatus as claimed in claim 1 further comprising means for DC biasing said laser diodes.

10. Apparatus as claimed in claim 6 wherein said PIN diode means further comprises a second plurality of PIN diodes parallel coupled to each of said first plurality of PIN diodes, respectively.

11. Apparatus as claimed in claim 7 wherein said material is GaAs, InP, or Au doped Si.

12. Apparatus as claimed in claim 8 wherein said voltage source has a voltage slightly below the breakdown voltage of said PIN diode means.

13. Apparatus as claimed in claim 9 wherein said biasing means provides a current between about 3 to 4 times the lasing threshold current of said laser diodes.

14. Apparatus as claimed in claim 9 wherein said biasing means provides a current about equal to the lasing threshold current of said laser diodes.

* * * * *